(12) United States Patent
Kikuchi et al.

(10) Patent No.: US 8,686,291 B2
(45) Date of Patent: Apr. 1, 2014

(54) INSULATING VARNISH AND INSULATED WIRE FORMED BY USING THE SAME

(75) Inventors: Hideyuki Kikuchi, Hitachi (JP); Hidehito Hanawa, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 396 days.

(21) Appl. No.: 13/037,727

(22) Filed: Mar. 1, 2011

(65) Prior Publication Data
US 2011/0240331 A1    Oct. 6, 2011

(30) Foreign Application Priority Data

Mar. 30, 2010   (JP) .................................. 2010-078838

(51) Int. Cl.
*H01B 7/00*   (2006.01)
(52) U.S. Cl.
USPC .............. 174/110 R; 174/110 SR; 174/110 N
(58) Field of Classification Search
USPC ....... 174/36, 110 R, 110 SR, 120 R; 428/379, 428/375, 383
See application file for complete search history.

(56) References Cited

U.S. PATENT DOCUMENTS

| 4,000,362 | A  | * | 12/1976 | Kawaguchi et al. .... 174/120 SR |
| 4,505,980 | A  | * | 3/1985  | Nishizawa et al. ........... 428/383 |
| 6,811,875 | B2 |   | 11/2004 | Kikuchi et al. |
| 6,956,100 | B2 | * | 10/2005 | Imaizumi et al. ............. 528/310 |
| 2006/0240254 | A1 | * | 10/2006 | Kikuchi et al. ............... 428/375 |
| 2006/0240255 | A1 | * | 10/2006 | Kikuchi et al. ............... 428/375 |
| 2009/0202831 | A1 | * | 8/2009  | Honda et al. .................. 428/383 |

FOREIGN PATENT DOCUMENTS

| JP | 2001-307557 A | 11/2001 |
| JP | 2006-299204 A | 11/2006 |

* cited by examiner

*Primary Examiner* — William H Mayo, III
(74) *Attorney, Agent, or Firm* — Foley & Lardner LLP

(57) ABSTRACT

An insulating varnish usable for an insulating coat of an insulated wire on a conductor with a quadrangular cross section contains polyamide-imide resin varnish and organosilica sol mixed with the polyamide-imide resin varnish. The polyamide-imide resin varnish contains solvent and polyamide-imide resin. The organosilica sol contains dispersion medium and silica particles dispersed in the dispersion medium. Cyclic ketones having boiling point in a range of 130 to 180° C. make up 70 to 100 wt % or more of the dispersion medium.

7 Claims, 1 Drawing Sheet

INSULATING VARNISH AND INSULATED WIRE FORMED BY USING THE SAME

The present application is based on Japanese patent application No. 2010-078838 filed on Mar. 30, 2010, the entire contents of which are incorporated herein by reference.

BACKGROUND OF THE INVENTION

1. Field of the Invention

The present invention relates to an insulating varnish and an insulated wire formed therewith and, in particular, to an insulating varnish suitable for a coil of electric equipment such as a motor or a transformer, and an insulated wire formed by using the insulating varnish.

2. Description of the Related Art

In recent years, inverter control of an electric equipment with high-voltages and heavy-current is widely performed to meet demands for miniaturization, and performance enhancing for electric equipment. In that case, high inverter surge voltage (steep overvoltage) often occurs in an electric equipment by inverter control. When such an inverter surge voltage occurs, there is fear that the inverter surge voltage affects an isolation system of coils of the electric equipment. In particular, in the insulated wire used for a coil, partial discharge occurs mainly between wires (between insulating coats of individual insulated wires) or between a wire and the ground (between an insulating coat and a stator core). This partial discharge causes a problem that erosion of the insulating layer progresses and insulation breakdown occurs thereby.

As such an insulated wire used in a coil of an electric equipment, generally, an insulated wire (enamel wire) comprising a single-layered or multi-layered insulating coat is used. The single-layered or multi-layered insulating coat is formed by applying and baking insulating varnish, which is prepared by dissolving polyimide resin, polyamide-imide resin, polyester-imide resin, or the like into solvent, around a conductor having a round cross-section.

As methods to form the insulating coat for suppressing erosion of the insulating coat by the partial discharge in such an insulated wire, methods using insulating varnishes, such as varnish prepared by directly adding and dispersing powder of inorganic insulating particles such as silica particles or titania particles in resin solution in which polyamide-imide resin or the like is dissolved in solvent, or varnish prepared by mixing organosilica sol that prepared by dispersing silica particles in dispersion medium in resin solution, are known. The methods are disclosed, for example, in JP-A-2001-307557 and JP-A-2006-299204.

SUMMARY OF THE INVENTION

In order to further improve an efficiency of a motor of the electric equipment as described above, a space factor of a coil in the motor needs to be increased. Therefore, as an insulated wire for constituting the coil, an insulated wire is proposed that its insulating coat is formed on a conductor (a rectangular conductor) with a quadrangular cross section (i.e., a rectangular cross section).

However, as shown in FIG. 2, in forming an insulating coat 22 on a conductor 21, insulating varnish may be drifted from the corner regions 23 of the conductor 21 toward the flat regions 24 due to the surface tension of the insulating varnish in the process of baking the insulating varnish varnished on the conductor 21 to form the insulating coat. As a result, the insulating coat 22 on corner regions 23 might be thinner than that on flat regions 24. Namely, there is a problem that the conventional insulating varnish is poor in paintability (i.e., external appearance quality after baking) to a conductor with a quadrangular cross section.

A purpose of the present invention is to provide an insulating varnish having both good dispersibility of silica particles and good paintability to a conductor with a quadrangular cross section and an insulated wire in which an insulating coat is formed by using such insulating varnish.

(1) According to one embodiment of the invention, an insulating varnish usable for an insulating coat of an insulated wire on a conductor with a quadrangular cross section comprises:

polyamide-imide resin varnish and organosilica sol mixed with the polyamide-imide resin varnish, the polyamide-imide resin varnish comprising solvent and polyamide-imide resin, wherein the organosilica sol contains dispersion medium and silica particles dispersed in the dispersion medium; and cyclic ketones having boiling point in a range of 130 to 180° C. make up 70 to 100 wt % or more of the dispersion medium.

In the above embodiment (1) of the invention, the following modifications and changes can be made.

(i) The solvent of the polyamide-imide resin varnish contains cyclic ketones having boiling point in a range of 130 to 180° C.

(ii) The cyclic ketones makes up 15 to 100 wt % of the total solvent component composed of the solvent and the dispersion medium.

(iii) At least one of cycloheptanone, cyclohexanone, and cyclopentanone is used as the cyclic ketones.

(2) According to another embodiment of the invention, an insulated wire comprises:

a conductor with a quadrangular cross section; and an insulating coat on a surface of the conductor, the insulating coat being formed by using the insulating varnish of the above embodiment (1).

In the above embodiment (2) of the invention, the following modifications and changes can be made.

(iv) A lubricity insulating coat is formed on a surface of the insulating coat.

Points of the Invention

According to one embodiment of the invention, an insulating varnish is fabricated as follows. The insulating varnish contains polyamide-imide resin varnish and organosilica sol mixed in the polyamide-imide resin varnish. The polyamide-imide resin varnish contains solvent and polyamide-imide resin in the solvent. The organosilica sol contains dispersion medium and silica particles dispersed in the dispersion medium. Cyclic ketones having the boiling point in a range of 130 to 180° C. make up 70 to 100 wt % of the dispersion medium. Thereby, the insulating varnish can have both good dispersibility of silica particles and good paintability (i.e., external appearance quality after baking) to a conductor with a quadrangular cross section.

BRIEF DESCRIPTION OF THE DRAWINGS

The preferred embodiment according to the invention will be explained below referring to the drawings, wherein.

DETAILED DESCRIPTION OF THE PREFERRED EMBODIMENTS

Figure 1:
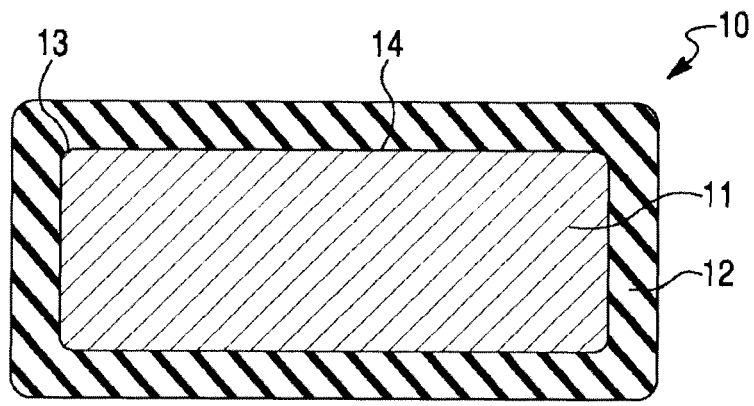
FIG. 1 is a cross sectional view showing an insulated wire in a preferred embodiment according to the invention.
Figure 2:
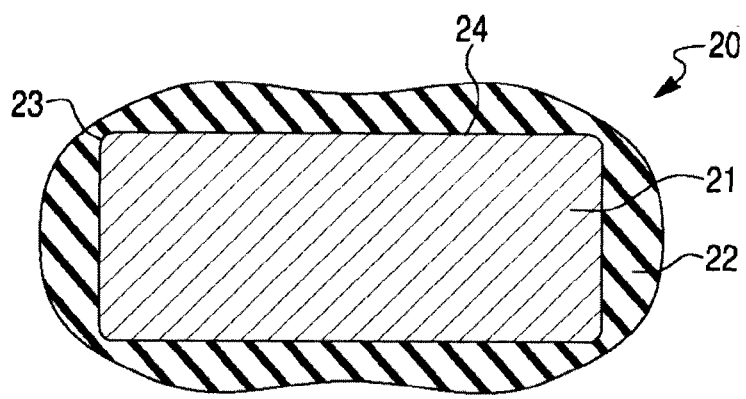
FIG. 2 is a cross sectional view showing a conventional insulated wire.

The preferred embodiment according to the invention will be explained below.

Insulating Varnish

An insulating varnish in the embodiment of the invention is formed by mixing polyamide-imide resin varnish composed of solvent and polyamide-imide resin with organosilica sol. Silica particles dispersed in dispersion medium that mainly consist of cyclic ketones having the boiling point in the range of 130 to 180° C. in the organosilica sol included in the insulating varnish used for an insulated wire in which an insulating coat is formed on a conductor with a quadrangular cross section.

Since the insulating varnish in the embodiment of the invention has such composition, the silica particles included in the insulating varnish are not agglutinated, and thus paintability of the insulating varnish to the conductor with a quadrangular cross section can be increased. This is assumed to be due to the increased drying characteristic of the insulating varnish (i.e. due to the drying rate of the insulating varnish higher than that of conventional varnishes). When the insulating varnish in the embodiment of the invention is applied to the conductor with a quadrangular cross section, it is presumed that the insulating varnish begins to dry before the insulating varnish applied to corner regions of the conductor begins to drift to flat regions. Accordingly, the insulating varnish is hard to drift to the flat regions, thus increase of the thickness of the insulating coat on the flat regions and significant decrease of the thickness of the insulating coat on the corner regions can be prevented.

As a result, the insulated wire having the insulating coat, in which dispersibility of silica particles is good and of which thicknesses on the flat regions and the corner regions are almost same (i.e. difference between the thickness of the insulating coat on the flat regions and the thickness of the insulating coat on the corner regions is small), on the conductor with a quadrangular cross section can be provided. Since the thickness of the insulating coat is almost uniform, the insulated wire in which insulating performance such as breakdown resistance and partial discharge resistance is increased can be reproducibly provided. Additionally, since it is not necessary to use a conductor with a specially-shaped cross section or the like for preventing the thickness of the insulating coat on the corner regions from decreasing, especial paint die or paint process is not needed. Furthermore, since complex process to form the insulated wire with quadrangular cross section is not many, working properties do not decrease, and thus there is no fear that the cost of the insulated wire is elevated due to decrease of working properties.

Organosilica Sol

It is preferred that the dispersion medium for the organosilica sol, which is mixed in the insulating varnish in the embodiment of the invention, mainly consist of cyclic ketones having the boiling point in the range of 130 to 180° C. As such cyclic ketones, for example, at least one of cycloheptanone of which the boiling point is 180° C., cyclohexanone of which the boiling point is 156° C., and cyclopentanone of which the boiling point is 131° C. can be used. Also, ketones such as 2-cyclohexe-1-one in which a part of or all of cyclic structure is unsaturated can be used.

Note that, dispersion medium in which aromatic hydrocarbons, lower alcohol, or solvent such as N-methyl-2-pyrrolidone (NMP), N,N-dimethylformamide (DMF), or N,N-dimethyl acetamide (DMAC) is mixed with the above cyclic ketones can be used for such purposes as increasing stability of the organosilica sol or the insulating varnish in which the organosilica sol is mixed with the polyamide-imide resin varnish. Here, the cyclic ketone preferably makes up 70 wt % or more of the total dispersion medium in the organosilica sol because affinity of the organosilica sol with the polyamide-imide resin varnish decreases as ratio of materials except the cyclic ketones in the dispersion medium increases.

The average particle diameter of the dispersion particles in the organosilica sol measured by BET method is preferably not more than 100 nm in order to suppress decrease of paintability of the insulating varnish to conductor with a quadrangular cross section and to make partial discharge resistance of the insulating coat effective. Furthermore, it is more preferable that the average particle diameter is not more than 30 nm in order to improve transparency of the organosilica sol.

The above organosilica sol can be obtained by, for example, solvent substitution for silica sol that is obtained by hydrolysis of alkoxy silane or ion exchange for water glass. However, fabricating method of the organosilica sol is not limited to the above method, and the organosilica sol can be prepared by any known method.

A suitable range of the moisture content in the organosilica sol varies from the composition of the dispersion medium. In general, stability or mixing performance with the resin varnish of the organosilica sol decreases when the moisture content is too much. Accordingly, the moisture content in the organosilica sol is preferably not more than 1.0 wt %. Since dispersibility of the dispersion particles in the dispersion medium with the above composition is high, the silica concentration in the organosilica sol can be as high as more than not less than 20 wt %.

Polyamide-Imide Resin Varnish

The polyamide-imide resin varnish is preferably obtained by synthesis reaction of two principal components that are isocyanate component containing 4,4'-diphenyl methane diisocyanate (MDI) etc. and acid component containing trimellitic anhydride (TMA) etc. in solvent in view of characteristic, cost, and ready availability. However, if the insulated wire, which has the insulating coat composed of the polyamide-imide resin varnish, having heat resistance up to 220° C. or more can be formed, the raw materials of the polyamide-imide resin varnish are not limited to aromatic isocyanates, aromatic carboxylic acid and acid anhydrides, thus the polyamide-imide resin varnish can be prepared by known methods including the method in which aromatic diamine such as 4,4'-diaminodiphenylmethane (DAM) is mixed with acid chloride such as trimellitic chloride (TMAC).

Note that, molecular structure units between amide bonds and imide bonds align relatively systematically in such polyamide-imide resin varnish, the polyamide-imide resin varnish has crystallinity albeit only slightly due to hydrogen bonds and $\pi$-$\pi$ interaction, etc. For example, when biphenyl structure easily having orientation in molecular frame thereof is introduced, even if NMP solvent is used, solubility of the resin thereof decrease and precipitation occurs in some case.

For example, as a solvent used for the polyamide-imide resin varnish, the solvent including at least one of γ-butyrolactone, N-methyl-2-pyrrolidone (NMP), N,N-dimethylformamide (DMF), N,N-dimethylacetamide (DMAC), dimethylimidazolidinone (DMI), and cyclic ketones can be used.

In view of compatibility of organosilica sol and polyamide-imide resin varnish, the solvent preferably contains cyclic ketones having the boiling point in the range of 130° C. to 180° C. As the cyclic ketones used for the solvate of the polyamide-imide resin varnish, as well as the cyclic ketones used for the solvate of the organosilica sol, for example, at least one of cycloheptanone of which the boiling point is 180° C., cyclohexanone of which the boiling point is 156° C., and cyclopentanone of which the boiling point is 131° C. can be used. Also, ketones such as 2-cyclohexe-1-on in which a part of or all of cyclic structure is unsaturated can be used.

As the method to obtain the polyamide-imide resin varnish by dissolving polyamide-imide resin into varnish containing cyclic ketones, any known methods can be used, and the method is not limited to a specific method. For example, a method in which resin is precipitated from polyamide-imide resin varnish synthesized in solvent mainly composed of NMP, thus only a resin content is collected, subsequently the polyamide-imide resin varnish is obtained by dissolving the resin content into the solvent containing cyclic ketones again, a method in which the polyamide-imide resin varnish is directly synthesized in the solvent containing cyclic ketones, or a method in which cyclic ketones is added into polyamide-imide resin varnish synthesized in low-boiling solvent such as DMF and solvent substitution is carried out by distillation, etc., can be used.

γ-butyrolactone or the cyclic ketones is inferior to NMP or the like in solubility with the polyamide-imide resin. Accordingly, it is preferred that polyamide-imide resin contains isocyanates except MDI, tricarboxylic acids except TMA or tetracarboxylic acids except TMA, together with MDI and TMA is used as polyamide-imide resin mainly composed 4,4'-diphenyl methane diisocyanate (MDI) and trimellitic anhydride (TMA) when the polyamide-imide resin is dissolved in solvent consisting of γ-butyrolactone or the cyclic ketones, thereby disturbing relatively-systematic array of the polyamide-imide resin depending on the raw material thereof, which decreases crystallinity of the polyamide-imide resin.

Isocyanates

It is preferred that, for example, aliphatic diisocyanate such as hexamethylene diisocyanate (HDI), isophorone diisocyanate (IPDI), dicyclohexylmethane diisocyanate (H-MDI), xylylene diisocyanate (XDI), or hydrogenerated XDI or aromatic diisocyanate such as tolylene diisocyanate (TDI), or diphenyl sulfone diisocyanate (SDI) is used concurrently with 4,4'-diphenyl methane diisocyanate (MDI), which is used for decreasing crystallinity of the polyamide-imide resin by disturbing relatively-systematic array of the polyamide-imide resin depending on the raw material thereof, as the isocyanate used for the polyamide-imide resin. Additionally, polyfunctional isocyanate such as triphenylmethane triisocyanate or a multimer such as polymeric isocyanate or TDI may be used as another isocyanate like the aliphatic diisocyanate and the aromatic diisocyanate. Furthermore, isocyanate containing a isomer of TDI or MDI can produce the same effects.

Aromatic diisocyanates are preferably used for the polyamide-imide resin obtained by synthesis reaction of MDI and TMA so that the polyamide-imide resin has excellent properties such as heat resistance up to 220° C. or more and excellent mechanical property. Additionally, it is especially preferred that polymeric MDI or liquid monomeric MDI is used concurrently with aromatic diisocyanates so that change of the basic structure of the polyamide-imide resin is kept to the minimum and the solubility is increased. When isocyanate except MDI is used concurrently with MDI, the isocyanate except MDI preferably makes up 2 to 30 mol % and more preferably makes up 2 to 15 mol % of the total isocyanate components. Additionally, SDI with sulfone groups as linking groups is effective to increase the solubility.

Tetracarboxylic Acids and Tricarboxylic Acids

Tetracarboxylic acids, tricarboxylic acids, or the like is used as acid component except the trimellitic anhydride (TMA), which is used for decreasing crystallinity of the polyamide-imide resin by disturbing relatively-systematic array of the polyamide-imide resin depending on the raw material thereof, for the acid component of the polyamide-imide resin.

As the tetracarboxylic acids, for example, aromatic tetracarboxylic dianhydride such as 3,3',4,4'-diphenyl sulfone tetracarboxylic dianhydride (DSDA), 3,3',4,4'-benzophenone tetracarboxylic dianhydride (BTDA), or 4,4'-oxydiphthalic anhydride (ODPA), or alicyclic tetracarboxylic dianhydride such as butane tetracarboxylic dianhydride or 5-(2,5-dioxotetrahydro-3-furanyl)-3-methyl-3-cyclohexene-1,2-dicarboxylic anhydride is used. As the tricarboxylic acids, for example, tricarboxylic acid such as trimesic acid or tris(2-carboxyethyl)isocyanurate (CIC acid) is used.

Aromatic tetracarboxylic dianhydrides are preferably used as the tetracarboxylic acids so that the polyamide-imide resin varnish has excellent properties. Furthermore, DSDA or BTDA is more preferably used due to good solubility thereof. Although tetracarboxylic dianhydrides with ester groups may be used concurrently with TMA for such purposes as providing flexibility to polyamide-imide resin, that is preferably used in small amounts to suppress decrease of heat resistance and hydrolyzability. When tetracarboxylic dianhydride and/or tricarboxylic acid are used concurrently with TMA, the tetracarboxylic dianhydride and/or tricarboxylic acid preferably make up 2 to 20 mol % and more preferably make up 2 to 10 mol % of the total acid components.

Mixture Ratio of MDI and TMA

When γ-butyrolactone or cyclic ketones is used as a solvent used for the polyamide-imide resin varnish and the polyamide-imide resin is synthesized by copolymerization of several kinds of isocyanate components and several kinds of acid components, in view of the above mixture ratio of the isocyanate components, 4,4'-diphenyl methane diisocyanate (MDI) preferably makes up 70 to 98 mol % and more preferably makes up 85 to 98 mol % of the isocyanate components. Additionally, in view of the above mixture ratio of the acid components, trimellitic anhydride (TMA) preferably makes up 80 to 98 mol % and more preferably makes up 90 to 98 mol % of the acid components. Furthermore, when an average value of the molar ratio of MDI in the isocyanate components and the molar ratio of TMA in the acid components is be defined as a total mixture ratio, the total mixture ratio is preferably in the range of 85 to 98 mol %.

Catalyst

When the polyamide-imide resin varnish is synthesized, catalyst that does not inhibit stability of the varnish such as amines, imidazoles, or imidazolines may be used to suppress decrease of synthetic reactivity of the polyamide-imide resin.

As shown in FIG. 1, an insulated wire in an embodiment of the present invention contains an insulating coat 12 that is formed by a method in which the insulating varnish of an embodiment of the invention is applied on a conductor 11 with a quadrangular cross section and is baked.

Note that, the insulated wire in an embodiment of the present invention may have an adhesion-imparting insulating coat, a flexibility-imparting insulating coat, or the like between the conductor 11 and the insulating coat 12 or between the insulating coat 12 and another insulating coat (not shown). The adhesion-imparting insulating coat is an insulating coat for increasing adhesion of the conductor 11 and the insulating coat 12 or of the insulating coat 12 and another insulating coat. The flexibility-imparting insulating coat is an insulating coat for increasing flexibility of the insulated wire. Additionally, the insulated wire may have a lubricity-imparting insulating coat for imparting lubricity to the insulated wire, a scratch resistance-imparting insulating coat for imparting scratch resistance to the insulated wire, or the like around the insulating coat 12. Above another insulating coat, the adhesion-imparting insulating coat, the flexibility-imparting insulating coat, the lubricity-imparting insulating coat, and the scratch resistance-imparting insulating coat may be formed by applying and baking of the insulating varnish, or by extrusion molding with an extruder.

EXAMPLES

Method of Producing the Insulated Wire

Enamel wires in examples of the embodiment of the present invention and in comparative examples have been formed by the following methods.

First, polyamide-imide resin varnish containing 100 parts by weight of polyamide-imide resin and 300 parts by weight of solvent was prepared, and organosilica sol containing 100 parts by weight of silica of 10 nm in average particle diameter and 300 parts by weight of dispersion medium was prepared. Next, insulating varnish was obtained by mixing the polyamide-imide resin varnish and the organosilica sol so that 100 parts by weight of the resin content of the polyamide-imide resin varnish and 30 parts by weight of the silica were contained.

Then, the obtained insulating varnish was applied and baked on a copper conductor, thereby forming an insulating coat of 50 μm in thickness, and thus an insulated wire was obtained. Here, the copper conductor had a quadrangular cross section in which the thickness and width are respectively 2.0 and 3.0 mm and the curvature radius of the corner regions is 0.3 mm.

Example 1

The insulating varnish was obtained by mixing organosilica sol in which cycloheptanone made up 100 wt % of the dispersion medium with polyamide-imide resin varnish in which cyclohexanone made up 100 wt % of the solvent. Cyclic ketones made up 100 wt % of the total solvent component composed of the solvent and the dispersion medium.

Example 2

The insulating varnish was obtained by mixing organosilica sol in which cyclohexanone made up 100 wt % of the dispersion medium with polyamide-imide resin varnish in which γ-butyrolactone and NMP respectively made up 85 and 15 wt % of the solvent. Cyclic ketones made up 23.1 wt % of the total solvent component composed of the solvent and the dispersion medium.

Example 3

The insulating varnish was obtained by mixing organosilica sol in which cyclohexanone and γ-butyrolactone respectively made up 77.8 and 22.2 wt % of the dispersion medium with polyamide-imide resin varnish in which γ-butyrolactone, NMP and cyclohexanone respectively made up 80, 15 and 5 wt % of the solvent. Cyclic ketones made up 21.8 wt % of the total solvent component composed of the solvent and the dispersion medium.

Example 4

The insulating varnish was obtained by mixing organosilica sol in which cyclohexanone and DMAC respectively made up 72.2 and 27.8 wt % of the dispersion medium with polyamide-imide resin varnish in which γ-butyrolactone made up 100 wt % of the solvent. Cyclic ketones made up 16.7 wt % of the total solvent component composed of the solvent and the dispersion medium.

Example 5

The insulating varnish was obtained by mixing organosilica sol in which cyclopentanone and DMAC respectively made up 83.3 and 16.7 wt % of the dispersion medium with polyamide-imide resin varnish in which γ-butyrolactone, cyclohexanone and NMP respectively made up 50, 33.3 and 16.7 wt % of the solvent. Cyclic ketones made up 44.9 wt % of the total solvent component composed of the solvent and the dispersion medium.

Example 6

The insulating varnish was obtained by mixing organosilica sol in which cyclohexanone made up 100 wt % of the dispersion medium with polyamide-imide resin varnish in which cyclohexanone and NMP respectively made up 50 and 50 wt % of the solvent. Cyclic ketones made up 61.5 wt % of the total solvent component composed of the solvent and the dispersion medium.

Comparative Example 1

The insulating varnish was obtained by mixing organosilica sol in which γ-butyrolactone made up 100 wt % of the dispersion medium with polyamide-imide resin varnish in which γ-butyrolactone made up 100 wt % of the solvent. Cyclic ketones made up 0 wt % of the total solvent component composed of the solvent and the dispersion medium.

Comparative Example 2

The insulating varnish was obtained by mixing organosilica sol in which γ-butyrolactone made up 100 wt % of the dispersion medium with polyamide-imide resin varnish in which cyclohexanone and γ-butyrolactone respectively made up 13.3 and 86.7 wt % of the solvent. Cyclic ketones made up 10.3 wt % of the total solvent component composed of the solvent and the dispersion medium.

Comparative Example 3

The insulating varnish was obtained by mixing organosilica sol in which DMAC made up 100 wt % of the dispersion medium with polyamide-imide resin varnish in which NMP and DMF respectively made up 80 and 20 wt % of the solvent. Cyclic ketones made up 0 wt % of the total solvent component composed of the solvent and the dispersion medium.

Comparative Example 4

The insulating varnish was obtained by mixing organosilica sol in which cyclohexanone and γ-butyrolactone respectively made up 61.1 and 38.9 wt % of the dispersion medium with polyamide-imide resin varnish in which NMP and DMF respectively made up 80 and 20 wt % of the solvent. Cyclic ketones made up 14.1 wt % of the total solvent component composed of the solvent and the dispersion medium.

The following test for the insulated wires formed by using the insulating varnishes in Examples 1 to 6 and Comparative Examples 1 to 4 was conducted.

The formed insulated wire was buried in a resin for fixing the insulated wire, and the cross sections of the ends of the insulated wire buried in the resin were polished together with the resin. Thicknesses of the insulating coat on flat regions and the corner regions of the conductor were measured at the cross sections exposed by the polishing.

Additionally, two test wires of approximately 20 cm in length were picked up from the formed insulated wires and fixed back-to-back. Then, sine wave AC voltage of which the frequency was 10 kHz and which the voltage was 1.5 kV was applied between the two test wires, thus V-t (voltage-time) characteristic of the two test wires in normal condition was valuated by measuring time until breakdown.

Furthermore, two test wires of approximately 20 cm in length were picked up from the formed insulated wires and fixed back-to-back under condition in which the two test wires were extended by 20% in the length direction under tension. Then, sine wave AC voltage of which the frequency was 10 kHz and which the effective voltage was 1.5 kV was applied between the two test wires, thus V-t characteristic of the two test wires in the condition, in which the two test wires were extended by 20%, was valuated by measuring time until breakdown.

The measurement results and the evaluation results are shown in Table 1.

50 µm that was a target value. Thus, an insulated wire having the insulating coat in which the thickness was almost constant on the whole periphery of the conductor is obtained. Additionally, it was found that the insulated wires of Examples 1 to 6 had better V-t characteristic than the insulated wires of Comparative Examples 1 to 4. Note that, the insulated wires of Examples 1 to 6 was formed by using the insulating varnish in which the organosilica sol was dispersed in the polyamide-imide resin varnish, silica particles were dispersed in the dispersion medium in the organosilica sol, and cyclic ketones having the boiling point in the range of 130° C. to 180° C. made up 70 wt % or more of the dispersion medium.

On the other hand, in the all of insulated wires of Comparative Examples 1 to 4, the thickness of the insulating coat on the corner regions was much (approximately 20 µm) less than 50 µm that was a target value and was approximately 17 to 25 µm less than that on the flat regions. Additionally, V-t characteristic was also low in the insulated wires of Comparative Examples 1 to 4. From the results shown in Table 1, it is found that cyclic ketones preferably make up 15 to 100 wt % of the total solvent component composed of the solvent and the dispersion medium.

As described above, according to the embodiment of the present invention, the insulating varnish, in which the organosilica sol is mixed in the polyamide-imide resin varnish

TABLE 1

| | | | Example | | | | | | Comparative example | | | |
|---|---|---|---|---|---|---|---|---|---|---|---|---|
| | | | No. 1 | No. 2 | No. 3 | No. 4 | No. 5 | No. 6 | No. 1 | No. 2 | No. 3 | No. 4 |
| Composition of polyamide-imide resin varnish | Polyamide-imide resin (parts by weight) | | 100 | 100 | 100 | 100 | 100 | 100 | 100 | 100 | 100 | 100 |
| | Solvent | Cyclohexanone (parts by weight) | 300 | | 15 | | 100 | 150 | | 40 | | |
| | | γ-butyrolactone (parts by weight) | | 255 | 240 | 300 | 150 | | 300 | 260 | | |
| | | NMP (parts by weight) | | 45 | 45 | | 50 | 150 | | | 240 | 240 |
| | | DMF (parts by weight) | | | | | | | | | 60 | 60 |
| Composition of organosilica sol | Silica (parts by weight) | | 30 | 30 | 30 | 30 | 30 | 30 | 30 | 30 | 30 | 30 |
| | Dispersion medium | Cycloheptanone (parts by weight) | 90 | | | | | | | | | |
| | | Cyclohexanone (parts by weight) | | 90 | 70 | 65 | | 90 | | | | 55 |
| | | Cyclopentanone parts by weight) | | | | | 75 | | | | | |
| | | γ-butyrolactone (parts by weight) | | | 20 | | | | 90 | 90 | | 35 |
| | | DMAC (parts by weight) | | | | 25 | 15 | | | | 90 | |
| | Content of cyclic ketones in dispersion medium (wt %) | | 100.0 | 100.0 | 77.8 | 72.2 | 83.3 | 100.0 | 0.0 | 0.0 | 0.0 | 61.1 |
| Content of cyclic ketones in total solvent component (wt %) | | | 100.0 | 23.1 | 21.8 | 16.7 | 44.9 | 61.5 | 0.0 | 10.3 | 0.0 | 14.1 |
| Property of insulated wire | Thickness of insulating coat (mm) | Minimum in a longer direction on flat regions | 0.050 | 0.051 | 0.050 | 0.051 | 0.051 | 0.050 | 0.050 | 0.050 | 0.052 | 0.051 |
| | | Minimum in a shorter direction on flat regions | 0.052 | 0.050 | 0.051 | 0.051 | 0.052 | 0.052 | 0.054 | 0.053 | 0.048 | 0.049 |
| | | Average of minimums on four corner regions | 0.051 | 0.043 | 0.047 | 0.045 | 0.049 | 0.050 | 0.025 | 0.031 | 0.028 | 0.032 |
| | V-t characteristic (h) 10 kHz-1.5 kV | in normal condition | 52.6 | 48.1 | 45.6 | 42.2 | 47.9 | 51.5 | 4.2 | 7.1 | 5.2 | 9.0 |
| | | in 20% extended condition | 45.3 | 42.8 | 38.2 | 35.9 | 43.0 | 44.6 | 3.2 | 6.6 | 3.9 | 7.5 |

As shown in Table 1, in the insulated wires of Examples 1 to 6, the thickness of the insulating coat on the corner regions and that on the flat regions ware almost same and were around composed of the solvent and the polyamide-imide resin, is used for forming the insulating coat on the conductor with a quadrangular cross section in the insulated wire, silica particles are dispersed in the dispersion medium in the organosilica sol, and cyclic ketones having the boiling point in the range of 130° C. to 180° C. made up 70 to 100 wt % of the dispersion medium. Therefore, dispersibility of silica particles is good in the insulating varnish, and the insulating coat of which thicknesses on the flat regions and the corner regions of the conductor are almost same (i.e. difference between the thickness of the insulating coat on the flat regions and that on the corner regions is small) can be formed. In other words, according to the embodiment of the present invention, the insulating varnish, which has both good dispersibility of silica particles and good paintability to the conductor with a quadrangular cross section, and the insulated wire containing an insulating coat that is formed by using such insulating varnish and has almost constant thickness can be provided.

Additionally, the insulating varnish and the insulated wire of which environmental impact is reduced can be provided by using cyclic ketones for both the solvent and the dispersion medium in the insulating varnish in the embodiment of the invention.

Although the embodiment and Examples of the invention have been described above, the invention according to claims is not to be limited to the above-mentioned embodiment and Examples. Further, please note that not all combinations of the features described in the embodiment and Examples are not necessary to solve the problem of the invention.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. An insulating varnish usable for an insulating coat of an insulated wire on a conductor with a quadrangular cross section, comprising:
   a polyamide-imide resin varnish and an organosilica sol mixed with the polyamide-imide resin varnish, the polyamide-imide resin varnish comprising a solvent and a polyamide-imide resin;
   wherein the organosilica sol contains a dispersion medium and silica particles dispersed in the dispersion medium, and
   at least one cyclic ketone having a boiling point in a range of 130 to 180° C. makes up 70 to 100 wt % of the dispersion medium.

2. The insulating varnish according to claim 1, wherein the solvent of the polyamide-imide resin varnish contains at least one cyclic ketone having a boiling point in a range of 130 to 180° C.

3. The insulating varnish according to claim 2, wherein the at least one cyclic ketone of the dispersion medium and the at least one cyclic ketone of the solvent make up 15 to 100 wt % of a total amount of the solvent and the dispersion medium.

4. The insulating varnish according to claim 2, wherein at least one of cycloheptanone, cyclohexanone, and cyclopentanone is used as the at least one cyclic ketone of the solvent.

5. The insulating varnish according to claim 1, wherein at least one of cycloheptanone, cyclohexanone, and cyclopentanone is used as the at least one cyclic ketone of the dispersion medium.

6. An insulated wire, comprising:
   a conductor with a quadrangular cross section; and
   an insulating coat on a surface of the conductor, the insulating coat being formed by using the insulating varnish according to claim 1.

7. The insulated wire according to claim 6, wherein a lubricity insulating coat is formed on a surface of the insulating coat.

* * * * *